's Patent

United States Patent [19]
Lew

[11] Patent Number: 4,796,472
[45] Date of Patent: * Jan. 10, 1989

[54] LEVEL DETECTOR WITH MULTIPLE MAGNETICALLY ACTIVATED SWITCHES

[76] Inventor: Hyok S. Lew, 7890 Oak St., Arvada, Colo. 80005

[*] Notice: The portion of the term of this patent subsequent to Mar. 15, 2005 has been disclaimed.

[21] Appl. No.: 71,776

[22] Filed: Jul. 10, 1987

Related U.S. Application Data

[63] Continuation-in-part of Ser. No. 913,100, Sep. 29, 1986, Pat. No. 4,730,491.

[51] Int. Cl.⁴ .................... G01F 23/62; H01H 35/18
[52] U.S. Cl. ........................................ 73/308; 73/313; 200/84 C
[58] Field of Search ................. 73/308, 313, DIG. 5; 200/84 C

[56] References Cited

U.S. PATENT DOCUMENTS

| | | | |
|---|---|---|---|
| 3,678,750 | 7/1972 | DiNoia et al. | 73/313 |
| 4,384,184 | 5/1983 | Alvarez | 73/313 |
| 4,466,284 | 8/1984 | Dumery | 73/313 |
| 4,730,491 | 3/1988 | Lew | 73/308 |

Primary Examiner—Daniel M. Yasich

[57] ABSTRACT

The linear position transducer of the present invention comprises a pair of elongated electrically conducting members disposed within an elongated tubular container following the length thereof, wherein at least one of the pair of elongated electrically conducting members has a high specific ohmic resistance. A plurality of normally open switches are disposed within the elongated tubular container at regular intervals in a parallel circuit arrangement intermediate the pair of elongated electrically conducting members, which switches are closed by a magnetic force field created by a magnet included in a marker slidably guided by the elongated tubular container. The position of the marker is determined from the difference in the ohmic resistance between two electric circuits respectively including in series one portion of the pair of elongated electrically conducting members and the switch closed by the magnetic field of the marker and in series the other portion of the pair and the same switch closed by the magnetic field, wherein the closed switch divides the pair of elongated electrically conducting members into the one and and the other portions.

11 Claims, 2 Drawing Sheets

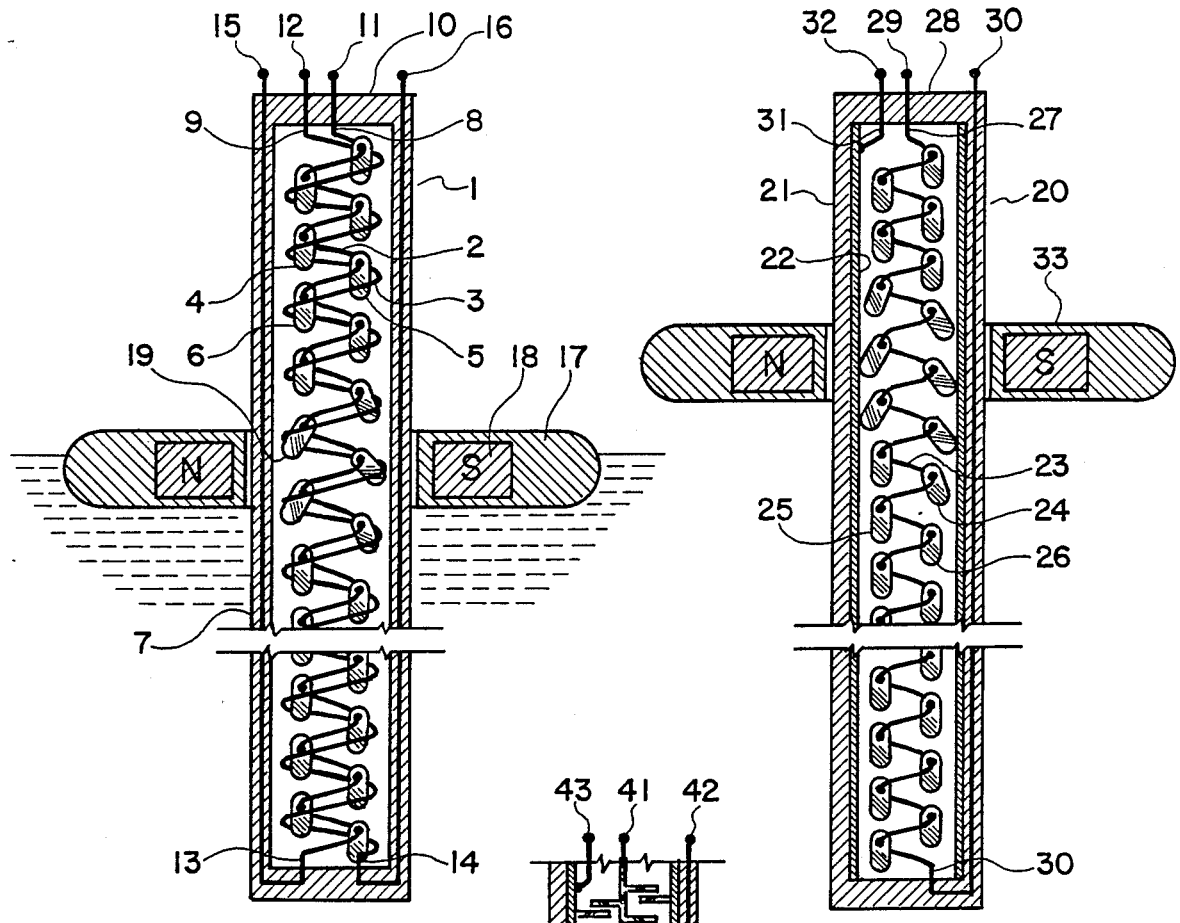
Fig. 1
Fig. 2
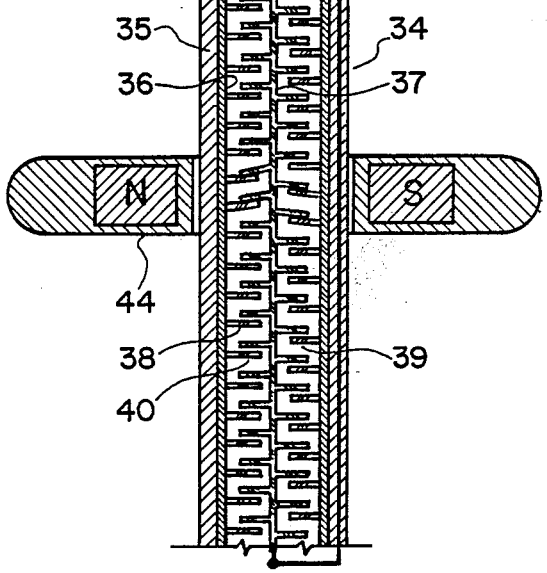
Fig. 3

LEVEL DETECTOR WITH MULTIPLE MAGNETICALLY ACTIVATED SWITCHES

BACKGROUND OF THE INVENTION

This patent application is a continuation-in-part application to patent application Ser. No. 913,100 entitled "Magnetically Activated Multiple Switch Level Detector" filed on Sept. 29, 1986 which is now U.S. Pat. No. 4,730,491.

The fluid level measuring technology dates back many hundreds of years and has a very broad field of applications. While the most widely used fluid level detectors are the single or multiple station on-off type level sensors, there has been a great deal of demand for continuously reading level detectors in recent years. Even though there are a number of different versions of continuously reading level detectors in the present day market, the industries dealing with the chemical, mineral, petroleum and pharmaceutical processing are still looking for a fool-proof and highly economic continuously reading level sensor as all of the existing models do not have the simplicity and reliability required by the industrial standards.

BRIEF SUMMARY OF THE INVENTION

The primary object of the present invention is to provide a simple and economic continuously reading level detector providing high reliability and accuracy.

Another object is to provide a level detector including a plurality of normally open magnetically activated switches disposed in a parallel installation intermediate a pair of elongated electrically conducting members wherein at least one of the two elongated electrically conducting members has a high specific ohmic resistance, which combination is packaged in a sealed elongated container vessel.

A further object is to provide a level detector comprising a marker or float slidably engaged by the container vessel, wherein the marker or float includes a magnet that closes the normally open magnetically activated switches located in the immediate vicinity of the marker or float.

Yet another object is to provide a level detector wherein the position of the marker or float is determined as a function of ohmic resistances of two electrical circuits respectively including two portions of at least one of the two elongated electrically conducting members with high specific ohmic resistance, which two portions are divided from one another by the closed magnetically activated switch or switches, and also commonly include the closed magnetically activated switch or switches as a component thereof.

Yet a further object is to provide a level detector wherein the ohmic reistance of the closed magnetically activated switch or switches is eliminated in the process of determining the position of the marker or float from the measured ohmic resistance values of the aforementioned two electrical circuits; whereby, the position of the marker or float so determined is independent of the ohmic resistance contributed by the closed magnetically activated switch or switches.

Still another object is to provide a level detector employing a plurality of the normally open magnetically activated switches wherein the earth's gravitational pull opens the switches and a magnetic field closes the switches.

Still a further object is to provide a level detector employing a plurality of the normally open magnetically activated switches wherein the mechanical spring force opens the switches and a magnetic field closes the switches.

These and other objects of the present invention will become clear as the description thereof proceeds.

BRIEF DESCRIPTION OF THE FIGURES

The present invention may be described with a great clarity and specificity by referring to the following figures :

FIG. 1 illustrates a cross section of an embodiment of the linear position transducer bar slidably engaged by a marker or float.

FIG. 2 illustrates a cross section of another embodiment of the linear position transducer bar slidably engaged by a marker or float.

FIG. 3 illustrates a cross section of a further embodiment of the linear position transducer bar.

DESCRIPTION OF THE ILLUSTRATED EMBODIMENTS

Figure 4:
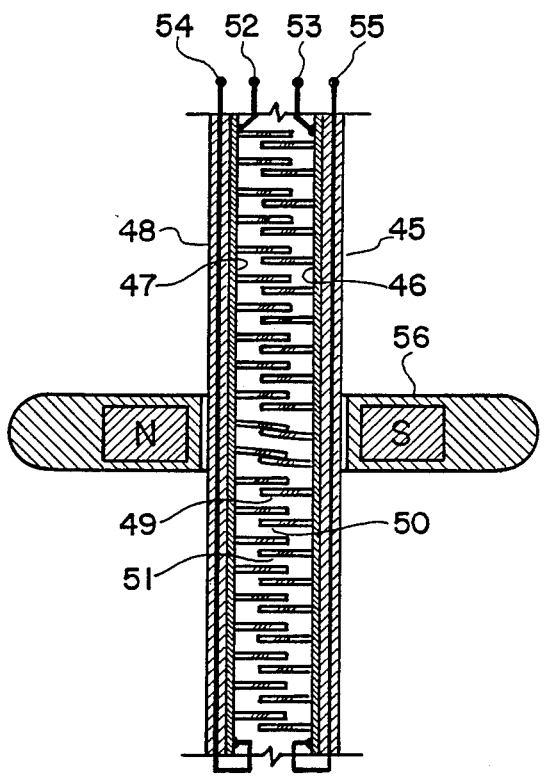
FIG. 4 illustrates a cross section of yet another embodiment of the linear position transducer bar.

In FIG. 1 there is illustrated a cross section of an embodiment of the linear position transducer bar 1 constructed in accordance with the principles of the present invention, which cross section is taken along a plane including the central axis thereof. The linear position transducer bar 1 comprises a pair of elongated electrically conducting members 2 and 3 disposed in a parallel arrangement following the lengthwise direction of the transducer bar 1 wherein at least one of the two electrically conducting members 2 and 3 has a high specific ohmic resistance. The first electrically conducting member 2 is disposed in a helical pattern following a first hypothetical cylindrical surface of a smaller diameter, while the second electrically conducting member 3 is disposed in another helical pattern following a second hypothetical cylindrical surface of a larger diameter. A plurality of pendulous switches 4, 5, 6, etc. made of electrically conducting ferromagnetic material are disposed at regular intervals following the first electrically conducting member 2 and secured thereto in a pivoting relationship, which have a length long enough to be caught by the second electrically conducting member 3 when those switches are pivoted under a magnetic attractive force. The combinations of the two electrically conducting members 2 and 3, and the plurality of the pendulous switches 4, 5,6, etc. are enclosed within a sealed elongated container vessel made of nonmagnetic material. The first extremities of the two electrically conducting members 2 and 3 are respectively connected to two wires 8 and 9, which extend through one sealed end 10 of the container vessel 7 and terminate as two terminals 11 and 12. The second extremities of the two electrically conducting members 2 and 3 are respectively connected to two wires 13 and 14, which are routed through or following cylindrical wall of the container vessel 7 and emerge through the sealed end 10 and terminate as two terminals 15 and 16. The sealed container vessel 7 engages a marker or float 17 including at least one permanent magnet 18 in a sliding relationship. In actual construction, the void cylindrical space within the sealed container vessel 7 is occupied by a solid bar made of an electrically insulating material, which bar includes two helical grooves of two different depths respectively receiving the two electrically conducting members 2 and 3, and a plurality of axial grooves disposed in an axisymmetric pattern receiving the plurality of the pendulum switches 4, 5, 6, etc. in a free pivoting relationship. The pendulum switches 4, 5, 6, etc. are suspended from the first elongated conductor 2 in a pivoting relationship, which are kept at a vertically suspended open position by the earth's gravitational pull in the absence of the magnetic field. The magnetic force field of the magnet 18 included in the marker or float 17 pulls the pendulum switches laterally and pivots them to a nonvertical position where they extablish a contact with the second elongated conductor 3. The magnetic field of the magnet 18 included in the marker or float 17 pivots and closes one or more of the pendulum switches 19 located in the immediate vicinity of the marker or float 17 and, thus, established a localized electric connection between the two electrically conducting members 2 and 3 at a section of the linear transducer bar 1 where the marker or float 17 is located. One or more pendulum switches closed by the magnetic field of the magnet 18 included in the marker or float 17 establishes two electric circuits respectively including in series first portions of the two elongated conductors 2 and 3 and the pendulum switch closed by the magnetic field and in series second portions of the two elongated conductors and the pendulum switch closed by the magnetic field.

In FIG. 2 there is illustrated a cross section of another embodiment of the linear transducer bar 20 of the present invention. The sealed elongated container vessel 21 has its inner cylindrical surface covered with an electrically conducting nonmagnetic tubing 22. An elongated electrically conducting member 23 with a high specific electrical resistance is disposed within the sealed container vessel 21 in a helical pattern, which pivotably retains a plurality of the pendulum switches 24, 25, 26, etc. disposed at regular intervals following the electrically conducting member 23. The first extremity of the electrically conducting member 23 is connected to a wire 27 that extends through one sealed end 28 of the container vessel 22 and terminates as a terminal 29, while the second extremity is connected to another wire 30 that is routed through or following the cylindrical wall of the container vessel and emerges through the sealed end 28 where it is terminated as a terminal 30. A wire 31 connected to the electrically conducting nonmagnetic tubing 22 extends through the sealed end 28 and terminates as a terminal 32. The elongated sealed container vessel 21 engages a marker or float 33 with a magnet in a sliding relationship. In actual construction, the inner cylindrical space of the container vessel includes a bar made of electrically insulating nonmagnetic material, that includes a helical groove receiving the elongated electrically conducting member 23 and a plurality of the axial grooves receiving the plurality of pendulum switches 24, 25, 26, etc. in a free pivoting relationship. The magnet included in the marker or float pivots one or more of the pendulum switches located in the immediate vicinity thereof and, thus, establishes a localized electrical connection between the elongated electrically conducting member 23 and the electrically conducting tubing 22 at a section where the marker or float 33 is located. It should be mentioned that the embodiments shown in FIGS. 1 and 2 show only a few illustrative examples among many designs capable of implementing the operating principles of the present invention. Therefore, the present invention teaching the principles of the construction of the linear position transducer bar and operating principles is not limited to the particular structural embodiments illustrated in FIGS. 1 and 2.

In FIG. 3 there is illustrated a cross section of a further embodiment of the linear position transducer 34 constructed in accordance with the principles of the present invention, which comprises an elongated sealed container vessel 35 with inner cylindrical surface covered with a thin walled electrically conducting nonmagnetic tubing 36 and an elongated electrically conducting member 37 with a high specific electrical resistance disposed within the container vessel 35 in a coaxial arrangement. A plurality of normally open reed switches 38, 39, 40, etc. disposed in a parallel arrangement intermediate the conducting tubing 36 and the elongated conducting member 37 are distributed at regular intervals following the central axis of the linear position transducer bar. The terminals 41 and 42 are respectively connected to the two extremities of the elongated electrically conducting member 37, while the terminal 43 is connected to the conducting tubing 36. The individual reed switch comprises a pair of thin ferromagnetic leaf springs respectively anchored to the conducting tubing 36 and the elongated conducting member 37 and extending towards to one another in a spaced overlapping arrangement, wherein the mechanical spring force thereof keeps them separated from one another in the absence of the magnetic field. The magnetic field created by the magnet included in the marker or float 44 closes one or more of the reed switches located at a section where the marker or float 4 is positioned.

In FIG. 4 there is illustrated a cross section of yet another embodiment of the linear position transducer bar 45 of the present invention, that includes a pair of elongated electrically conducting members 46 and 47 disposed in a parallel arrangement within the sealed container vessel 48. At least one of the two elongated electrically conducting members 46 and 47 must have a high specific ohmic resistance. A plurality of reed switches 49, 50, 51, etc. disposed in a parallel arrangement intermediate the two conducting members 46 and 47 are disposed at regular intervals following the central axis of the linear position transducer bar 45. The four terminals 52, 53, 54 and 55 are respectively connected to the four extremities of the two elongated conducting members 46 and 47. The magnetic field of the magnet included in the marker or float 56 closes one or more of the reed switches located on a section where the marker or float 56 is located. It should be understood that, in addition to the embodiments shown in FIGS. 3 and 4, there are many other structural combinations of the elongated electrically conducting members and the plurality of the reed switches which are capable of implementing the principles of the present invention. It should be mentioned that, in general, it is desirable to use nonferromagnetic materials for all elements constituting the linear position transducer bars of the present invention with the exception of the pendulum switches and reed switches. The distribution of the pendulum switches or reed switches at regular intervals following a helical path provides an advantage, as such a distribution enables one to construct a linear position transducer bar of a high resolution.

Figure 5:
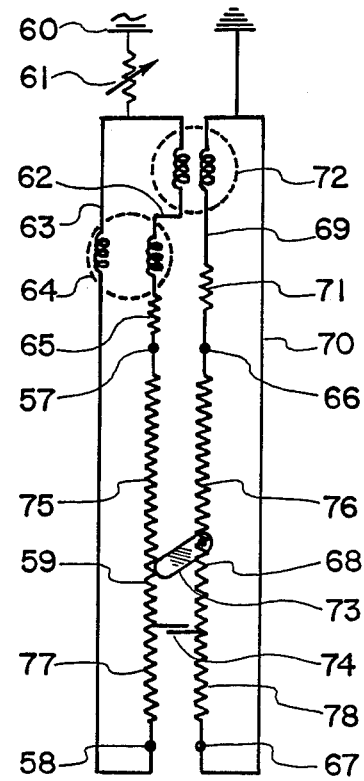
FIG. 5 illustrates an embodiment of the electrical circuitry usable in conjunction with the linear position transducer bar of the present invention.

In FIG. 5 there is illustrated an embodiment of the electrical circuitry usable in conjunction with the linear position transducer of the present invention that includes a pair of elongated electrically conducting members having high specific ohmic resistance, which linear position transducer may have the construction described in conjunction with FIGS. 1 or 4. The first and second extremities 57 and 58 of the first high resistance elongated conductor 59 are connected to a common dc or ac power source 60 which may include a variable resistor 61 that sets the level of the input electromotive force to a desired level. The two parallel connecting wires 62 and 63 respectively connected to the two extremities of the first high resistance conductor 59 include a first ratio meter 64 that measures the ratio of the electric currents flowing through the two parallel circuits 62 and 63. The second connecting wire 62 may include a resistor 65 that balances the resistances of the two connecting wires 62 and 63. The first and second extremities 66 and 67 of the second high resistance elongated conductor 68 are connected to a common ground. The resistance of the two parallel connecting wires 69 and 70 may be balanced by a resistor 71 included in the connecting wire 69. The second ratio meter 72 measures the ratio of the electric currents flowing through the two connecting wires 62 and 69. The plurality of the normally open magnetically activated switches such as the pendulum switches 73 or the reed switches 74 are disposed intermediate the two high resistance elongated conductors 59 and 68 in an arrangement as illustrated in FIGS. 1 or 4.

The total resistance $\phi_1$ of the first electric circuit comprising the connecting wire 62, the first portion 75 of the first high resistance elongated conductor 59, the first portion 76 of the second high resistance elongated conductor 68 and the connector wire 69 is given by equation $$\Omega_1 = 2\rho(h_o - h) + R_s + R_{con.1} \quad (1)$$

where $\rho$ is the specific ohmic resistance of the high resistance elongated conductor, h is the distance from the second extremity of the combination of the two high resistance elongated conductors to the normally open switch or switches which is now closed by the magnetic field of the marker or float, $h_o$ is the distance between the two extremities of the combination of the two high resistance elongated conductors, $R_s$ is the resistance of the closed switch or switches and $R_{con.1}$ is the resistance of the connecting circuits 62 and 69. The total resistance $\Omega_2$ of the second electric circuit comprising the connecting wire 63, the second portion 77 of the first high resistance elongated conductor 59, the second portion 78 of the second high resistance elongated conductor 68 and the connecting wire 70 is given by equation $$\Omega_2 = 2\rho h + R_s + R_{con.2} \quad (2)$$

where $h_o$ is the total length of the combination of the two high resistance elongated conductors and $R_{con.2}$ is the resistance of the connecting circuits 63 and 70. Simultaneous solution of equations (1) and (2) yields equation $$\frac{h}{h_0} = \frac{\Omega_2 - \Omega_1 - (R_{con.2} - R_{con.1})}{4\rho h_0} + \frac{1}{2}. \quad (3)$$

When the values of the resistors 65 and 71 are selected in such a way that $$R_{con.1} = R_{con.2} \quad (4)$$

equation (3) reduces to $$\frac{h}{h_0} = \frac{\Omega_2 - \Omega_1}{4\rho h_0} + \frac{1}{2}. \quad (5)$$

According to equation (5), the position of the marker or float is a linear function of the difference in ohmic resistances of the two electric circuits divided by the switch or switches closed by the magnetic field of the marker or float. Consequently, liquid level or position of the marker can be determined by measuring the ohmic resistances of the two electrical circuits and substituting those values into equation (3) or (5).

It can be easily shown that the relative position of the marker or float measured from the second extremity of the combination of the high resistance elongated conductors 59 and 68 is also given by equation $$\frac{h}{h_0} = \frac{1}{2} \cdot \frac{1 + I_{69}/I_{62}}{1 + I_{63}/I_{62}}, \quad (6)$$

where $I_{62}$, $I_{63}$ and $I_{69}$ respectively are the electric currents flowing through the connector circuits 62, 63 and 69. The ratios of the electric currents respectively appearing in the numerator and denominator of equation (6) can be readily measured by two ratio meters 72 and 64, respectively. Therefore, the liquid level or the position of the marker can be determined from the ratios of the electric currents measured by the two ratio meters 72 and 64. In general, $I_{62}$ is equal to $I_{69}$ and, consequently, only one ratio meter 64 is required in determining the liquid level or position of the marker. It should be mentioned that the grounding of the electric circuit 69 may be eliminated by closing the electric circuit as shwon in FIG. 6. When the electric power source is an ac source, the reactances of the two circuits divided by the closed switch or switches must be matched.

Figures 6, 7:
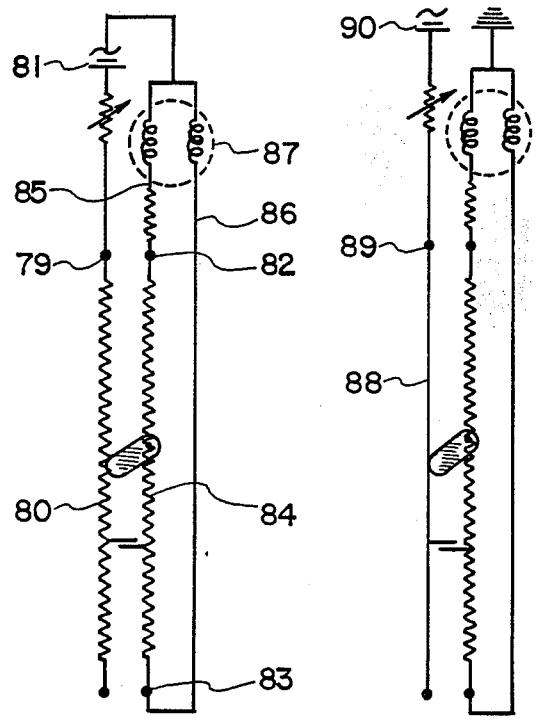
FIG. 6 illustrates another embodiment of the electrical circuitry usable in conjunction with the linear position transducer bar of the present invention.
FIG. 7 illustrates a further embodiment of the electrical circuitry usable in conjunction with the linear position transducer bar of the present invention.

In FIG. 6 there is illustrated another embodiment of the electric circuitry usable in conjuntion with the linear position transducer of the present invention in place of the electric circuitry shown in FIG. 5. This electric circuitry is a simplified version of that shown in FIG. 5. Only one extremity 79 of the first high resistance elongated conductor 80 is connected to one terminal of the electric power supply 81, while the other terminal of the power supply 81 is connected to both extremities 82 and 83 of the second high resistance elongated conductor 84 by a pair of parallel connecting circuits 85 and 86, which are routed through a ratio meter 87. With this electric circuitry, the liquid level or position of the marker is determined by equation $$\frac{h}{h_0} = \frac{\Omega_2 - \Omega_1 + (R_{con.2} - R_{con.1})}{2\rho h_0} + \frac{1}{2}, \quad (7)$$

or, for circuitry with balanced connector wire resistances, $$\frac{h}{h_0} = \frac{\Omega_2 - \Omega_1}{2\rho h_0} + \frac{1}{2}, \quad (8)$$

or by equation $$\frac{h}{h_0} = \frac{1}{1 + I_{86}/I_{85}}. \quad (9)$$

The ratio of the electric currents appearing in the denominator of equation (9) is measured by the ratio meter 87. In place of the closed circuit with two terminals connected to the two opposite terminals of the power sypply, an open circuit with one terminal connected to the power supply and another terminal grounded as shown in FIG. 5 may be employed.

In FIG. 7 there is illustrated a further embodiment of the electric circuitry usable in conjunction with a linear position transducer of the present invention, wherein only one of the two parallel elongated electrically conducting members has a high specific ohmic resistance as in the construction shown in FIGS. 2 or 3. This electric circuitry is the same as that shown in FIG. 6 with one exception being that the first elongated electrically conducting member with one extremity 89 connected to the power supply 90 does not have a high specific ohmic resistance. The liquid level or the position of the marker employing this electric circuitry is determined from equations (7), (8) or (9). It is easy to realize that the high resistance eleongated conductor 84 included in the embodiment shown in FIG. 6 is redundant as it does not play any role in determining the liquid level. Therefore, the electric circuit shown in FIG. 5 should be employed when both elongated electrically conducting members included in the linear position transducer have high specific resistance, while the electrical circuit shown in FIG. 7 should be used when only one of the two elongated electrically conducting members in the linear position transducer has a high specific resistance.

While the principles of the present invention have now been made clear by the illustrative embodiments, there will be immediately obvious to those skilled in the art many modifications of the structures, arrangements, proportions, elements and materials which are particularly adapted to the specific working environments and operating conditions in the practice of the invention without departing from those principles.

I claim:

1. An apparatus for detecting position comprising in combination :
   (a) an elongated tubular container;
   (b) a first elongated electrically conducting member disposed following the length of said elongated tubular container and enclosed therein;
   (c) a second elongated electrically conducting member disposed following the length of said elongated tubular container and enclosed therein, wherein at least one of the first and second elongated electrically conducting members has a high specific ohmic resistance;
   (d) a plurality of normally open switches disposed within said elongated tubular container at regular intervals in a parallel circuit arrangement intermediate said first and second elongated electrically conducting members, each of said plurality of normally open switches establishing electrical connection between said first and second elongated electrically conducting members when said normally open switch is closed, wherein the earth's gravitational pull acting on the normally open switches keeps the normally open switches at open position in the absence of a magnetic force field, and a magnetic force field closes the normally open switches;
   (e) a marker guided by said elongated tubular container in a sliding relationship, said marker including at least one magnet creating a magnetic force field penetrating into the interior of said elongated tubular container;
   (f) means for measuring ohmic resistances of two electric circuits respectively including in series one portion of said at least one elongated electrically conducting member having a high specific ohmic resistance intermediate one extremity thereof and the normally open switch closed by the magnetic force field of said marker, the normally open switch closed by the magnetic force field of said marker and a portion of the other elongated electrically conducting member, and in series the other portion of said at least one elongated electrically conducting member intermediate the normally open switch closed by the magnetic force field of said marker and the other extremity opposite to said one extremity, the normally open switch closed by the magnetic field of said marker and said a portion of the other elongated electrically conducting member; and
   (g) means for determining the position of said marker from the measured ohmic resistances of the two electric circuits, wherein contact resistance of the normally open switch closed by the magnetic field of said marker is eliminated in arithmetics providing the position of the marker.

2. The combination as set forth in claim 1 wherein said elongated tubular container is sealed off and said marker is a float floating at the free surface of a liquid medium.

3. The combination as set forth in claim 1 wherein said means for measuring the ohmic resistances of the two electric circuits comprises means for determining the ratio of two electric currents respectively flowing through the two electric circuits.

4. An apparatus for detecting position comprising in combination :
   (a) an elongated tubular container;
   (b) a first elongated electrically conducting member disposed following the length of said elongated tubular container and enclosed therein;
   (c) a second elongated electrically conducting member disposed following the length of said elongated tubular container and enclosed therein, wherein at least one of the first and second elongated electrically conducting members has a high specific ohmic resistance;
   (d) a plurality of normally open switches disposed within said elongated tubular container at regular intervals in a parallel circuit arrangement intermediate said first and second elongated electrically conducting members, each of said plurality of normally open switches establishing electrical connection between said first and second elongated electrically conducting members when said normally open switch is closed, wherein mechanical spring force included in the normally open switch keeps the normally open switch at open position in the absence of a magnetic force field and a magnetic force field closes the normally open switch;

(e) a marker guided by said elongated tubular container in a sliding relationship, said marker including at least one magnet creating a magnetic force field penetrating into the interior of said elongated tubular container;

(f) means for measuring ohmic resistances of two electric circuits respectively including in series one portion of said at least one elongated electrically conducting member having a high specific ohmic resistance intermediate one extremity thereof and the normally open switch closed by the magnetic force field of said marker, the normally open switch closed by the magnetic force field of said marker and a portion of the other elongated electrically conducting member, and in series the other portion of said at least one elongated electrically conducting member intermediate the normally open switch closed by the magnetic force field of said marker and the other extremity opposite to said one extremity, the normally open switch closed by the magnetic force field of said marker and said a portion of the other elongated electrically conducting member; and (g) means for determining the position of said marker from the measured ohmic resistances of the two electric circuits, wherein contact resistance of the normally open switch closed by the magnetic force field of said marker is eliminated in arithmetics providing the position of said marker.

5. The combination as set forth in claim 4 wherein said elongated tubular container is sealed off and said marker is a float floating at the free surface of a liquid medium.

6. The combination as set forth in claim 4 wherein said means for measuring the ohmic resistances of the two electric circuits comprises means for determining the ratio of two electric currents respectively flowing through the two electric circuits.

7. An apparatus for detecting position comprising in combination:

(a) an elongated tubular container;
(b) a first elongated electrically conducting member disposed following the length of said elongated tubular container and enclosed therein;
(c) a second elongated electrically conducting member disposed following the length of said elongated tubular container and enclosed therein, wherein at least one of the first and second elongated electrically conducting members has a high specific ohmic resistance;
(d) a plurality of normally open switches disposed within said elongated tubular container at regular intervals in a parallel circuit arrangement intermediate said first and second elongated electrically conducting members, each of said plurality of normally open switches establishing electrical connection between said first and second elongated electrically conducting members when said normally open switch is closed, wherein said normally open switch stays open in the absence of a magnetic force field and a magnetic force field closes the normally open switch;

(e) a marker guided by said elongated tubular container in a sliding relationship, said marker including at least one magnet creating a magnetic force field penetrating into the interior of said elongated tubular container; and (f) means for measuring ohmic resistances of two electric circuits respectively including in series first portion of said first and second elongated electrically conducting members intermediate one extremity thereof and the normally open switch closed by the magnetic force field of said marker and the normally open switch closed by the magnetic force field of said marker, and in series second portions of said first and second elongated electrically conducting members intermediate the normally open switch closed by the magnetic force field of said marker and the other extremity opposite to said one extremity and the normally open switch closed by the magnetic force field of said marker; and (g) means for determining the position of said marker from the measured ohmic resistances of the two electric circuits, wherein contact resistance of the normally open switch closed by the magnetic force field of said marker is eliminated in arithmetics providing the position of said marker.

8. The combination as set forth in claim 7 wherein the earth's gravitational pull acting on the normally open switch keeps the normally open switch at open position in the absence of a magnetic force field and a magnetic force field closes the normally open switch.

9. The combination as set forth in claim 8 wherein said elongated tubular container is sealed off and said marker is a float floating at the free surface of a liquid medium.

10. The combination as set forth in claim 7 wherein mechanical force included in the normally open switch keeps the normally open switch at open position in the absence of a magnetic force field and a magnetic force field closes the normally open switch.

11. The combination as set forth in claim 10 wherein said elongated tubular container is sealed off and said marker is a float floating at the free surface of a liquid medium.

* * * * *